(12) United States Patent
Polk

(10) Patent No.: US 10,672,083 B2
(45) Date of Patent: Jun. 2, 2020

(54) SYSTEMS AND METHODS FOR PROCESSING LEVIES

(75) Inventor: John David Polk, New Albany, OH (US)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 1381 days.

(21) Appl. No.: 13/494,329

(22) Filed: Jun. 12, 2012

(65) Prior Publication Data

US 2013/0332350 A1     Dec. 12, 2013

(51) Int. Cl.
   *G06Q 20/10*         (2012.01)
   *G06Q 40/00*         (2012.01)
   *G06Q 10/10*         (2012.01)

(52) U.S. Cl.
CPC ........... *G06Q 40/123* (2013.12); *G06Q 40/12* (2013.12); *G06Q 40/125* (2013.12); *G06Q 10/1053* (2013.01); *G06Q 20/10* (2013.01)

(58) Field of Classification Search
CPC ........ Y10S 707/9993; G06F 17/30569; G06Q 20/10; G06Q 10/1053
USPC .......................................................... 705/40
See application file for complete search history.

(56) References Cited

U.S. PATENT DOCUMENTS

| | | | |
|---|---|---|---|
| 5,946,669 A | 8/1999 | Polk | |
| 6,401,079 B1 * | 6/2002 | Kahn | G06Q 20/102 705/30 |
| 6,567,821 B1 | 5/2003 | Polk | |
| 7,072,909 B2 | 7/2006 | Polk | |
| 7,720,797 B2 | 5/2010 | Polk | |
| 7,739,195 B2 * | 6/2010 | Polk et al. | 705/44 |
| 7,752,727 B2 | 7/2010 | Mitchell | |
| 7,877,423 B2 * | 1/2011 | Polk | G06F 17/30569 705/40 |
| 2002/0133459 A1 * | 9/2002 | Polk et al. | 705/40 |
| 2007/0061157 A1 * | 3/2007 | Fry | G06Q 10/06 705/35 |
| 2013/0238514 A1 * | 9/2013 | Balogh et al. | 705/311 |

OTHER PUBLICATIONS

George, "Employee Garnishments and the Franchisee", Mar. 2, 2012, National Coalition of Associations of 7-Eleven Franchisees. (Year: 2012).*

\* cited by examiner

*Primary Examiner* — Christopher Bridges
*Assistant Examiner* — Abdulmajeed Aziz
(74) *Attorney, Agent, or Firm* — Finnegan, Henderson, Farabow, Garrett & Dunner, LLP

(57) ABSTRACT

A system for processing levies is disclosed. The system may have one or more memories storing instructions and one or more processors capable of executing the instructions. The processors may be configured to receive levy information related to one or more levy notices issued by a levier and convert the levy information into an electronic levy format. The processors may also be configured to notify an employer of the one or more levy notices using the converted levy information, receive levy payment information including an identifier and a payment amount for each of the one or more levy notices, and generate data to authorize a payment to the levier based on the received levy payment information.

11 Claims, 9 Drawing Sheets

| Target Employee ID | Employer ID | Date of Attempted Service | Last Date of Employment | Contact Information | | |
|---|---|---|---|---|---|---|
| John Doe | Company X | mm/dd/yy | mm/dd/yy | [Address] | | |
| Jane Smith | Company Y | mm/dd/yy | mm/dd/yy | [E-mail Address] | | |
| xxx-xxx-xxxx | [FEIN #] | mm/dd/yy | mm/dd/yy | [Phone] | | |
| ... | | | | | ... | |
| ... | | | | | | ... |

FIG. 5

| | Target Employee ID | Levier ID | Levy Balance | Withholding Amount | Pay |
|---|---|---|---|---|---|
| 1. | John Doe | IRS | $x,xxx.xx | $xxx.xx | ☑ |
| 2. | Jane Doe | IRS | $x,xxx.xx | $xxx.xx | ☑ |
| 3. | | | | | ☐ |
| 4. | | | | | ☐ |
| ••• | | | | | |
| N. | | | | | ☐ |

[SUBMIT]

FIG. 6

| Target Employee ID | Employer ID | Levier ID | Levy ID | Payment Date | Amount |
|---|---|---|---|---|---|
| xxx-xx-xxxx | [FEIN 1] | IRS | xxxxx | mm/dd/yy | $xxx.xx |
| | | | | | |
| | | | | | |
| | | | | | |

FIG. 7

SYSTEMS AND METHODS FOR PROCESSING LEVIES

FIELD

This application is related to systems and methods for processing levies and, more particularly, to systems and methods for facilitating the issuing, processing, and satisfying levies on the income of a target employee.

BACKGROUND

If a taxpayer does not pay her taxes, a government authority, such as the Internal Revenue Service (IRS) of the federal government or any other revenue service of a state or local government, may levy (i.e., seize) the taxpayer's property. In some instances, the levier (used herein generally to refer to any entity that may levy property, e.g., the IRS or any other state or local entity) may levy property such as wages, retirement accounts, dividends, or other sources of income that are held by an entity other than the taxpayer. For example, the levier may levy the taxpayer's income by issuing a notice of levy (i.e., levy notice or levy) on wages to the taxpayer's employer. In this example, the employer may withhold a certain portion of the employee taxpayer's wages and remit the withheld portion to the levier to satisfy the levy.

Conventional systems for processing tax levies may be inefficient for both leviers and employers. For example, a levier, such as the IRS, may send notices of levy on income to multiple employers. An exemplary notice is IRS form 668-W(c)(DO) "Notice of Levy on Wages, Salary, and Other Income" which may include, among other things, an identification of a taxpayer employee on whom the levy is being imposed and a total amount due (i.e., levy amount). The levier may send a notice for each employee whose property is being levied. Moreover, the levier may send the notices in various formats and possibly from different locations. For example, the IRS may send a combination of paper notices and electronic notices from multiple regional IRS offices located throughout the United States and its territories. Thus, employers may be burdened by having to receive and process a large amount of information in different formats from different locations. This problem may be exacerbated if the employer is also required to process levies from other leviers (e.g., state and local entities).

Other factors also may cause inefficiencies for the leviers and the employers. For example, if a levier sends a notice to an employer for an employee that is no longer employed by the employer (e.g., because employment has been terminated, the employee is deceased, etc.), the employer may not have an efficient way to notify the levier that the employee no longer works at the employer. Thus, the levier may continue to send notices to the wrong employer, increasing costs for both the levier and the employer. Additionally, even if the levier properly notifies the correct employer, the employer may not have an efficient way to submit a payment to the levier to satisfy the levy.

SUMMARY

In accordance with disclosed embodiments, a levy processing system is disclosed that facilitates interaction and communication between leviers and employers. The levy processing system may communicate with leviers, employers, and other entities, such as banks, to quickly and easily process levy notices received from a levier.

In accordance with certain embodiments, a system for processing levies is disclosed that includes one or more memories storing instructions and one or more processors capable of executing the instructions. The processors may be configured to receive levy information related to one or more levy notices issued by a levier and convert the levy information into an electronic levy format. The processors may also be configured to notify an employer of the one or more levy notices using the converted levy information, receive levy payment information including an identifier and a payment amount for each of the one or more levy notices, and generate data to authorize a payment to the levier based on the received levy payment information.

In accordance with other embodiments, a method for processing levies is disclosed that includes receiving levy information related to one or more levy notices issued by a levier and converting the levy information into an electronic levy format. The method may also include notifying an employer of the one or more levy notices using the converted levy information, receiving, from the employer, levy payment information including an identifier and a payment amount for each of the one or more levy notices, and generating data to authorize a payment to the levier, the payment corresponding to the received levy payment information.

In accordance with still other embodiments, a nontransitory computer-readable medium is disclosed. The computer-readable medium may store instructions that, when executed, enable one or more processors to receive levy information related to one or more levy notices issued by a levier and convert the levy information into an electronic levy format. The computer-readable medium may also enable the one or more processors to notify an employer of the one or more levy notices using the converted levy information, receive levy payment information including an identifier and a payment amount for each of the one or more levy notices, and generate data to authorize a payment to the levier, the payment corresponding to the received levy payment information.

Additional objects and advantages of the disclosed embodiments will be set forth in part in the description which follows, and in part will be obvious from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

The accompanying drawings, which are incorporated in and constitute a part of this specification, illustrate several embodiments and together with the description, serve to explain the principles of the disclosed embodiments.

BRIEF DESCRIPTION OF THE DRAWINGS

FIG. 5 illustrates an exemplary data structure that may be used by the levy processing system of FIG. 1A to generate non-employment notifications;

FIG. 6 illustrates an exemplary graphical user interface that may be displayed on a device associated with an employer;

FIG. 7 illustrates an exemplary data structure that may include levy payment information.

DESCRIPTION OF THE EMBODIMENTS

Reference will now be made in detail to the exemplary embodiments, examples of which are illustrated in the accompanying drawings. Wherever possible, the same reference numbers will be used throughout the drawings to refer to the same or like parts.

Figure 1:
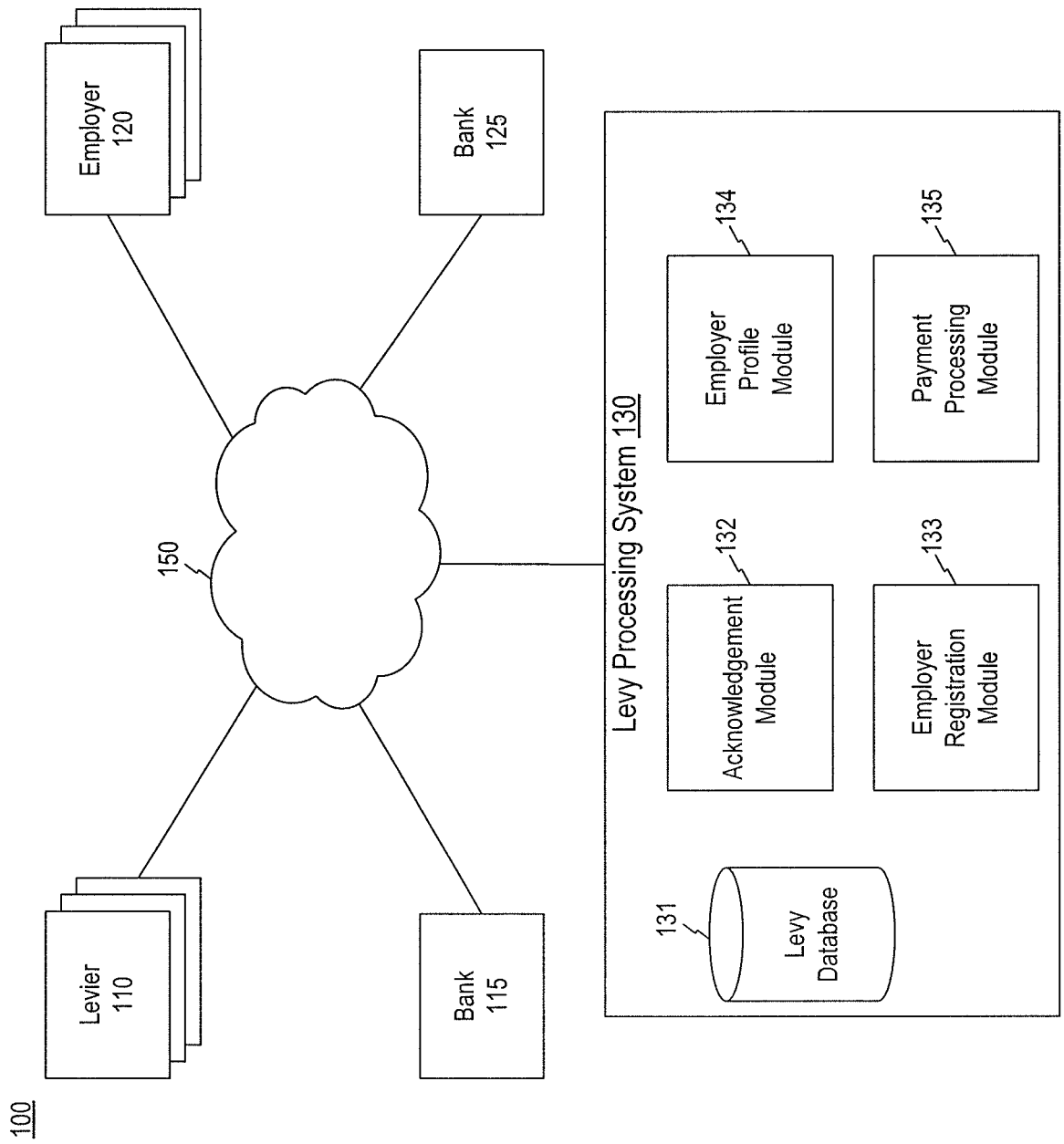
FIG. 1 is a block diagram of an exemplary system for issuing, processing, and satisfying levies, consistent with disclosed embodiments.

FIG. 1 is a block diagram of an exemplary system 100 for issuing, processing, and satisfying levies, consistent with disclosed embodiments. System 100 may include at least one levier 110, at least one employer 120, banks 115 and 125, and a levy processing system 130 connected via a network 150.

Levier 110 may include any organization or entity that is capable of levying the property of a taxpayer and issuing notices of levies to taxpayers and/or employers of taxpayers. For example, levier 110 may include the IRS, and/or any other revenue service or entity of a state or local government. In other embodiments, levier 110 may also be a tax collection agency that works as an agent of a government entity. While the discussion below refers to a single levier 110 in most cases, those skilled in the art will appreciate that system 100 may include a plurality of different leviers that may all interact in system 100 in the same manner as described with respect to levier 110.

Employer 120 may be any organization or entity that employs one or more employees. The employees at employer 120 may be responsible for paying taxes, e.g., to levier 110. If an employee at employer 120 does not pay her taxes, levier 110 may issue a notice of levy on that employee's income. While the discussion below generally refers to a single employer 120 in most cases, those skilled in the art will appreciate that system 100 may include a plurality of different employers, each employing a plurality of employees, and that each employer may interact in system 100 in the same manner as described with respect to employer 120.

Banks 115 and 125 may be financial institutions associated with levier 110, employer 120, and/or levy processing system 130. For example, bank 115 may be the bank of levier 110 and bank 125 may be the bank of levy processing system 130. As discussed in greater detail below, the banks may communicate with each other via network 150 and/or one or more automated clearing houses (ACHs) to transfer funds from bank 115 to bank 125 in order to satisfy one or more levies.

Levy processing system 130 may interact with levier 110 and employer 120, and, in certain embodiments, banks 115 and/or 125 to facilitate processing of levies within system 100. For example, as discussed in greater detail below, levy processing system 130 may receive levy information related to one or more levies from levier 110, convert the levy information into an electronic levy format, notify employer 120 of the one or more levies using the converted levy information, receive levy payment information from employer 120, and generate data to authorize a payment to levier 110 (or to the bank of levier 110).

In certain embodiments, levy processing system 130 may be provided separately from both levier 110 and employer 120, and may be operated by an entity that is separate from both levier 110 and employer 120. In other embodiments, all or part of the functionality of levy processing system 130 may be controlled by levier 110. In still other embodiments, levy processing system 130 may be operated by an entity that has a contractual relationship with levier 110.

Levy processing system 130 may include a levy database 131 that may store levies received from levier 110 and/or levy information that has been converted to a common format. Levy processing system 130 may also include software modules such as acknowledgement module 132, employer registration module 133, employer profile module 134, and payment processing module 135. Acknowledgement module 132 may be configured to receive acknowledgements of proof of service from employer 120, verifying that employer 120 has received the levy information from levy processing system 130. Employer registration module 133 may be configured to facilitate registration of employer 120 with levy processing system 130. Employer profile module 134 may facilitate the creation and maintenance of profiles associated with employer 120. Payment processing module 135 may be configured to receive levy payment information generated by employer 120 and authorize payments and the transfer of information regarding the payments to levier 110. Additional functions performed by these modules are discussed in greater detail below.

Figure 1A:
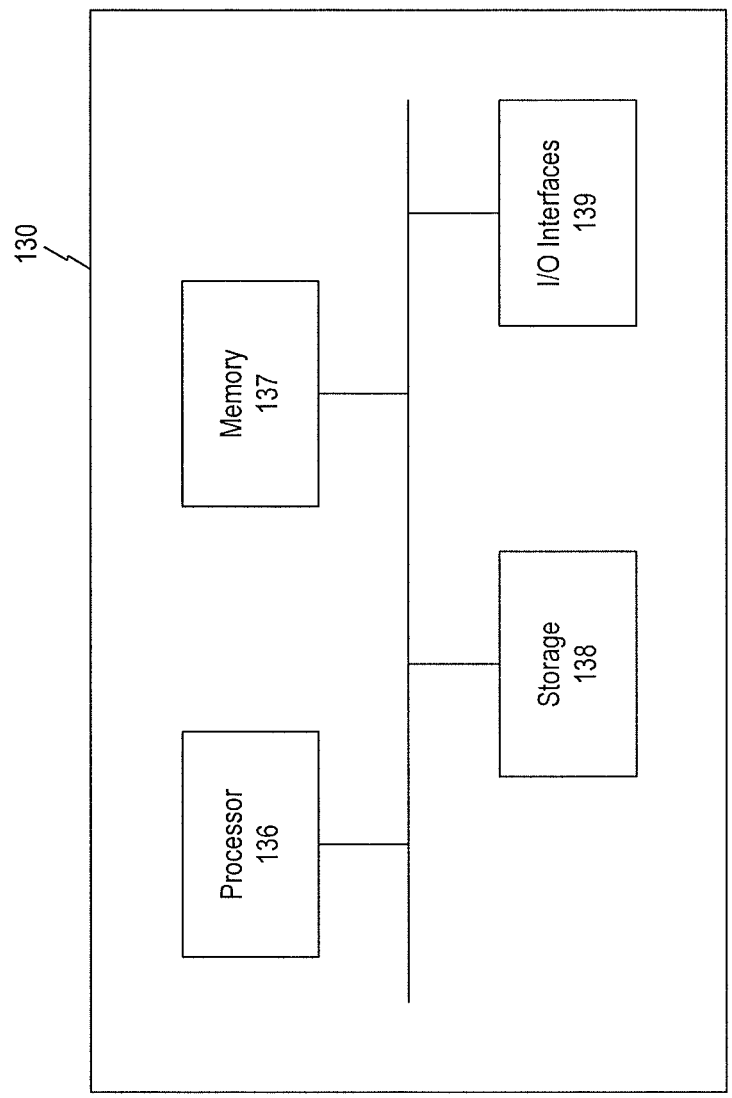
FIG. 1A is a block diagram of an exemplary levy processing system that may be included in the system of FIG. 1.

While FIG. 1 shows levy processing system 130 as including the separate modules discussed above, those skilled in the art will appreciate that these modules may be implemented as software stored in a memory and/or storage of levy processing system 130 and executed by a processor to enable levy processing system 130 to perform functions consistent with disclosed embodiments. For example, FIG. 1A illustrates a block diagram of an exemplary configuration of levy processing system 130 which may include a processor 136, a memory 137, a storage 138, and one or more input/output interfaces 139. Processor 136 may include one or more processing devices, such as a microprocessor from the Pentium™ or Xeon™ family manufactured by Intel™, the Turion™ family manufactured by AMD™, or any other type of processor. Storage 138 may include a volatile or non-volatile, magnetic, semiconductor, tape, optical, removable, nonremovable, or other type of computer-readable medium or computer-readable storage device. Storage 138 may store programs and/or other information, such as levy processing programs and/or programs used to implement on or more of the modules shown in FIG. 1, as discussed in greater detail below. Memory 137 may include one or more storage devices configured to store information used by levy processing system 130 to perform certain functions related to disclosed embodiments.

In one embodiment, memory 137 may include one or more levy processing programs or subprograms loaded from storage 138 or elsewhere that, when executed by processor 136, perform various procedures, operations, or processes consistent with the disclosed embodiments. For example, memory 137 may include one or more programs that enable levy processing system 130 to, among other things, receive levy information related to one or more levies from levier 110, convert the levy information into an electronic levy format, notify employer 120 of the one or more levies using the converted levy information, receive levy payment information from employer 120, and generate data to authorize a payment to levier 110.

Input/output interfaces 139 may enable levy processing system 130 to send and receive data to and from other devices or components of system 100, consistent with disclosed embodiments. While a bus architecture is shown in FIG. 1A as connecting the components of levy processing system 130, those skilled in the art will appreciate that any other type of architecture may be used.

Additionally, those skilled in the art will appreciate that levier 110 and employer 120 may also include components similar to those shown in FIG. 1A, such as a processor, memory, storage, and one or more input/output interfaces that enable levier 110 and employer 120 to perform functions consistent with the embodiments discussed below. For example, these components may be provided at a server, computer, or other device associated with levier 110 and/or employer 120. Thus, when actions are described as being performed by levier 110 and/or employer 120, those skilled in the art will appreciate that, in certain embodiments, these actions may be performed by devices associated with levier 110 and/or employer 120.

Network 150 may include any one of or combination of wired or wireless networks capable of supporting the types of communications between components of system 100 in FIG. 1, which are discussed in greater detail below. For example, network 150 may include wired networks such as twisted pair wire, coaxial cable, optical fiber, and/or a digital network. Likewise, network 150 may include any wireless networks such as microwave or cellular networks or wireless networks employing, e.g., IEEE 802.11 or Bluetooth protocols. Additionally, network 150 may be integrated into any local area network, wide area network, campus area network, or the Internet.

Figure 2:
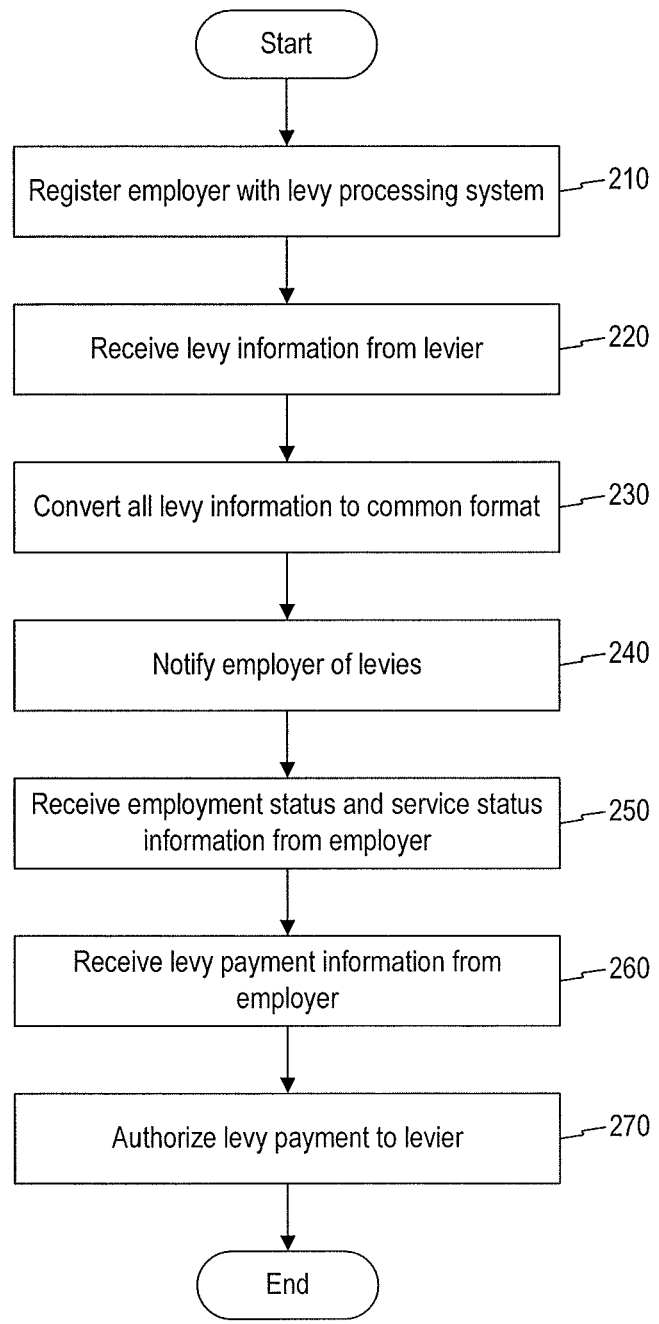
FIG. 2 is a flowchart of an exemplary method for processing levies that may be performed by the levy processing system of FIG. 1A.

FIG. 2 is a flowchart of an exemplary method for processing levies that may be performed by levy processing system 130. For example, levy processing system 130 may register employer 120 so that employer 120 may communicate with levy processing system 130 to process levy notices received from levier 110 (step 210). Employer registration module 133 may receive registration information from employer 120, such as employer demographic information (e.g., contact information, banking information, other identification mechanisms such as a federal employer identification number (FEIN), etc.). The registration information may also include employer preferences for receiving and processing the levies. For example, levy processing system 130 may receive an employer preference regarding how employer 120 would like to be notified of new levies, such as by fax, file transfer protocol (FTP), e-mail, etc. The registration information may also include other preferences such as the format of the data that employer 120 would like to receive and/or a frequency of service (i.e., how often employer 120 would like to be notified on incoming levies). This registration information may then be stored at levy processing system 130 or elsewhere.

Levy processing system 130 may also receive levy information from levier 110 (step 220). For example, levy processing system 130 may receive one or more notices of levy on income for one or more employee taxpayers. Each levy notice may include information such as an identification of the employee taxpayer against whom the levy is being applied (i.e., the target employee), an identification of the employer, and a levy amount reflecting the amount of money that the target employee owes. For example, one such notice may be in the form of an IRS form 668-W(c)(DO) issued by the IRS. Levy processing system 130 may store electronic data representing these levy notices in levy database 131.

Levy processing system 130 may then convert the levy information received from levier 110 to a common format (step 230). For example, as discussed, levy processing system 130 may receive levy information in a variety of formats and in a variety of medium (e.g., paper notices, electronic notices, etc.) Levy processing system 130 may convert the different levy notices into a common format, such as a format conforming to American National Standards Institute (ANSI) standards. For example, levy processing system 130 may convert the levy notices to ANSI X12 521 record sets. The ANSI X12 521 record set is a record set for income or asset offset and allows for the input of wage transfer instructions as well as other pertinent information related to a wage assignment transaction. Of course, other formats may also be used. For example, levy processing system 130 may convert the levy information into a data structure such as a table that includes, for each levy, an employee identifier, an employer identifier, a levier identifier, a levy amount representing the total amount due, and/or a payment amount representing the amount due for the current period (e.g., week, month, year, etc.) Levy processing system 130 may store the converted levy information in levy database 131.

Levy processing system 130 may notify employer 120 of the received levy notices, e.g., by sending the converted levy information from step 230 to employer 120 (step 240). In certain embodiments, levy processing system 130 may send the converted levy information to employer 120 using a method preferred by employer 120, which, as discussed, may have been received by employer registration module 133 when employer 120 registered with levy processing system 130. For example, employer 120 may choose to be notified of the levies via fax, e-mail, and/or FTP drop box. If employer 120 chooses fax or e-mail, levy processing system 130 may fax or e-mail the converted levy information to employer 120, as appropriate. For example, levy processing system 130 may generate and send an e-mail to employer 120 that includes the ANSI X12 521 record sets for employer 120 as an attachment to the e-mail. If employer 120 chooses FTP drop box as a delivery method, levy processing system 130 may upload the converted levy information corresponding to employer 120 to an FTP drop box designated or otherwise reserved for employer 120. Levy processing system 130 may also optionally send a reminder e-mail to employer 120 to pull the converted levy information from the FTP drop box. In another embodiment, employer 120 may pull the converted levy information from the FTP drop box at predetermined intervals (e.g., weekly, monthly, etc.) without levy processing system 130 sending a reminder e-mail.

Levy processing system 130 may receive employment status information and service status information from employer 120 (step 250). For example, after receiving the converted levy information from levy processing system 130, employer 120 may determine whether the target employees included in the converted levy information are employed by employer 120. This may be performed, for example, by cross referencing the list of target employees in the converted levy information with a database of current employees. If one or more target employees are not employed by employer 120, then employer 120 may notify levy processing system 130 that these employee(s) are not employed. This process is discussed in greater detail below with respect to FIG. 4.

The service status information received by levy processing system 130 may include an indication of whether service of the levy notices identified by the converted levy information has been acknowledged by employer 120. For example, if employer 120 elects to receive the converted levy information by e-mail, then levy processing system 130 may receive a notification that employer 120 received the e-mail. Such a notification may include a receipt that the e-mail has been opened on a computer associated with employer 120 and/or a receipt that the e-mail has been delivered to an inbox of an e-mail account associated with employer 120. Such a notification may also include a reply e-mail sent by a user associated with employer 120 indicating that the information has been received.

If employer 120 elects to receive the converted levy information by FTP drop box, then the service status information may include a notification that employer 120 has retrieved the converted levy information from the FTP drop box. For example, levy processing system 130 may receive a notification that employer 120 has accessed the FTP drop box and downloaded or viewed the converted levy information in the FTP drop box. If employer 120 elects to receive the converted levy information via fax, then the service status information may include a confirmation of fax receipt or a reply fax received from employer 120, confirming that the converted levy information has been received.

In the embodiments discussed above, the service status information may constitute proof of service for the levy notices that are represented by the converted levy information and for which employer 120 has not indicated that a target employee is not employed by employer 120. For example, if levy processing system 130 sends converted levy information to employer 120 representing fifty notices of levy on wages corresponding to fifty different target employees, and employer 120 sends employment status information indicating that three of the fifty target employees are not employed by employer 120, then the service status information received by levy processing system 130 may indicate that the levy notices corresponding to the remaining forty-seven target employees have been successfully served on employer 120.

Levy processing system 130 may also receive levy payment information from employer 120 (step 260). That is, upon receiving the converted levy information from levy processing system 130, employer 120 may process the converted levy information to generate payment information for satisfying the levy (e.g., for paying off at least the amount of money currently due on the levy notice for a particular period). For instance, for a particular levy notification that is represented by the converted levy information, employer 120 may generate information indicating an amount of money to be withheld from the target employee's income for a particular period. Exemplary methods by which employer 120 may generate this payment information and exemplary formats for the payment information are discussed in greater detail below with respect to FIGS. 6 and 7.

After receiving the payment information from employer 120, levy processing system 130 may generate data to authorize a payment to levier 110 (step 270). The data to authorize the payment may be generated based on the received payment information. For example, levy processing system 130 may generate data to authorize a payment to levier 110 in for the total amount of money included in the received payment information. Levy processing system 130 may generate the data to authorize the payment to levier 110 in different ways and different formats as discussed in greater detail below with respect to FIG. 8.

Figure 3:
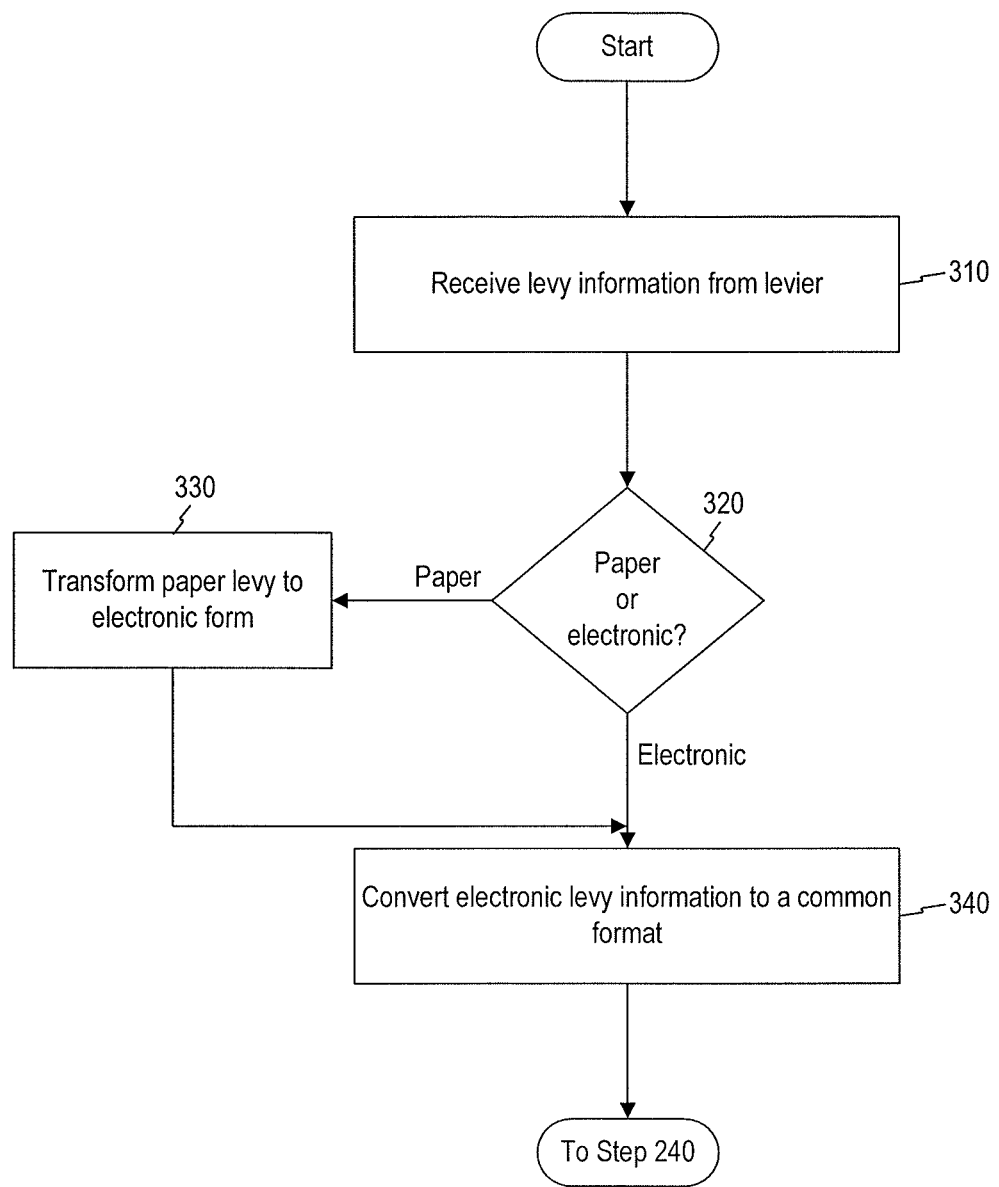
FIG. 3 is a flowchart of another exemplary method for processing levies that may be performed by the levy processing system of FIG. 1A.

FIG. 3 is a flowchart of another exemplary method for processing levies that may be performed by levy processing system 130. The process shown in FIG. 3 may be performed as a part of the process of FIG. 2, e.g., at steps 220 and 230. For example, levy processing system 130 may receive levy information from levier 110 (step 310). As discussed with respect to step 220, the levy information may be in a variety of formats and may be received either as paper levy notices or electronic levy notices.

Levy processing system 130 may determine whether the levy information received from levier 110 is in paper or electronic form (step 320). For levy information that is in paper form (step 320, paper) levy processing system 130 may transform the paper levy notice into electronic form (step 330). For example, the paper levy notices may be scanned into images and/or may be processed using one or more optical character recognition (OCR) programs to transform the paper levy notice into an electronic form.

If the levy notice is already in electronic form (step 320, electronic) or after any paper levy notices have been converted to electronic form in step 330, the electronic levy information may be converted to a common format (step 340). For example, as discussed, the levy information may be represented by ANSI X12 521 record sets. However, other formats may be used by levy processing system 130. For example, levy processing system 130 may convert the levy information into a data structure such as a table that includes, for each levy, an employee identifier, an employer identifier, a levier identifier, a levy amount representing the total amount due, and/or a payment amount representing the amount due for the current period (e.g., week, month, year, etc.)

If levy processing system 130 performed the process of FIG. 3 as a part of the process shown in FIG. 2, then levy processing system 130 may then proceed to step 240 in the process of FIG. 2 an notify employer 120 of the levies.

Figure 4:
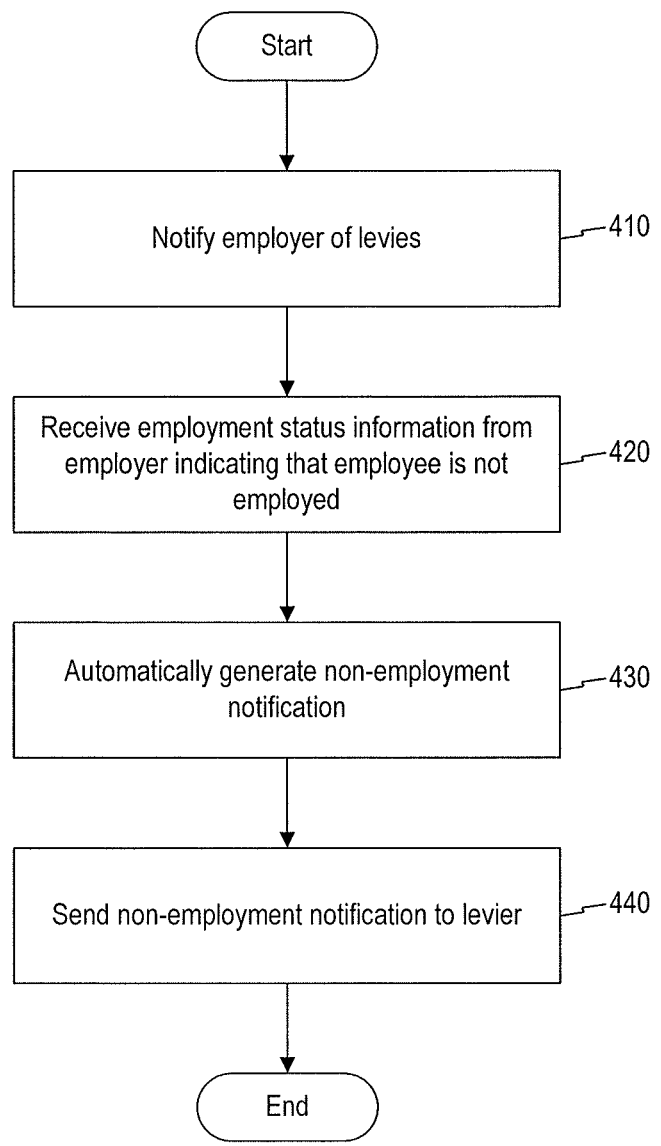
FIG. 4 is a flowchart of another exemplary method for processing levies that may be performed by the levy processing system of FIG. 1A.

FIG. 4 is a flowchart of another exemplary method for processing levies that may be performed by levy processing system 130. The process shown in FIG. 4 may be performed as a part of the process of FIG. 2, e.g., at steps 240 and 250. For example, levy processing system 130 may notify employer 120 of the received levies using the converted levy information, similar to step 240 discussed above (step 410).

After notifying employer 120 of the received levies, levy processing system 130 may receive employment status information from employer 120 indicating that one or more target employees is not employed by employer 120, similar to step 250 discussed above (step 420). This employment status information may include information such as a target employee identifier, and employer identifier, a last date of employment, and contact information for the target employee. The target employee identifier may include a name, social security number, voter registration number, taxpayer identification number, or any other identifier used to identify an individual. The employer identifier may include an employer name such as a corporation name, a federal employer identification number (FEIN), or any other identifier used to identify an individual. The contact information for the target employee may include a phone number, mailing address, e-mail address, etc.

Upon receiving the employment status information from employer 120 that indicates that a target employee is not employed by employer 120, levy processing system 130 may automatically generate a non-employment notification (step 430) and may send the non-employment notification to levier 110 (step 440) to inform levier 110 that the target employee associated with the levy notice is no longer employed by employer 120. In certain embodiments, the non-employment notification may include data for a single target employee that is no longer employed by employer 120. For example, each time levy processing system 130 receives employment status information indicating that a target employee is not employed, levy processing system 130 may automatically generate a non-employment notification and send that notification to levier 110. This non-employment notification may include information such as a target employee identifier, an employer identifier, a date of attempted service (i.e., a date on which employer 120 was notified of the levies in step 410), a last date of employment, and/or target employee contact information.

In other embodiments, the non-employment notification sent to levier 110 may include data for one or more target employees that are deceased or otherwise no longer employed by employer 120. For example, levy processing system 130 may maintain a no-longer-employed data structure that includes multiple target employees that are not employed by employer 120. Thus, levy processing system 130 may update the data structure by adding an entry for a particular target employee that is not employed in order to automatically generate a non-employment notification as shown in step 430.

FIG. 5 shows an exemplary no-longer-employed data structure 500 that may be used by levy processing system 130 to generate non-employment notifications. No-longer-employed data structure 500 may include rows 560 each corresponding to a target employee that has been determined not to be employed by employer 120. No-longer-employed data structure 500 may also include a target employee identifier column 510, an employer identifier column 520, a date of attempted service column 530, a last date of employment column 540, and a contact information column 550 for storing the corresponding information for a particular target employee, e.g., in cells 570. When levy processing system 130 receives employment status information from employer 120 indicating that a target employee is not employed, levy processing system 130 may generate a non-employment notification by generating a new row in no-longer-employed data structure 500 corresponding to the target employee.

Then, levy processing system 130 may send the non-employment notification to the levier (step 440) by sending the no-longer-employed data structure 500 including information for one or more target employees. Levy processing system 130 may send no-longer-employed data structure 500 at predetermined intervals, e.g., daily, weekly, monthly, etc. In certain embodiments levy processing system 130 may send no-longer-employed data structure 500 to levier 110 each time levy processing system 130 notifies employer 120 of the levy notices. For example, levy processing system 130 may send no-longer-employed data structure 500 at a predetermined time of day on the day that levy processing system 130 notifies employer 120. Constructing and sending no-longer-employed data structure 500 may allow levy processing system 130 to send fewer transactions to levier 110 while still informing levier 110 of the fact that the same number of target employees are not employed by employer 120.

Additionally, as shown in FIG. 5, no-longer-employed data structure 500 may include entries corresponding to multiple employers. For example, as discussed above, while employer 120 is discussed for exemplary purposes, those skilled in the art will appreciate that multiple employers may be included in system 100. Levy processing system 130 may thus notify multiple employers of levies and receive employment status information from multiple employers. The employment status information from the multiple employers may be stored in a single no-longer-employed data structure in certain embodiments. For example, the employer in the first entry is shown as "Company X" while the employer in the second entry is shown as "Company Y." This way, levy processing system 130 may send a single no-longer-employed data structure 500 to levier 110 that informs levier 110 of all of the target employees that are not employed by multiple employers within system 100. In other embodiments, levy processing system 130 may generate a separate no-longer-employed data structure 500 for each employer 120.

As discussed above, employer 120 may generate payment information and send this payment information to levy processing system 130. FIG. 6 shows an exemplary graphical user interface (GUI) 600 that may be displayed on a device associated with employer 120 to enable a user associated with employer 120 to generate the payment information. For example, GUI 600 may enable the user to select, from among a plurality of levies that are included in the levy information sent from levy processing system 130, which levies employer 120 will satisfy.

In certain embodiments, GUI 600 may display entries 610 that include information corresponding to the levies represented by the levy information. For example, the levy information may include two levies for target employees John Doe and Jane Doe, respectively. GUI 600 may display entries for each target employee, along with a target employee identifier 620, a levier identifier 630, a levy balance 640, and a withholding amount 650. Levy balance 640 may include an amount of money that is still owed to levier 110. As discussed, this amount may be included on the levy notice issued by levier 110 and thus may also be included in the levy information sent to employer 120. Withholding amount 650 may include an amount of money that employer 120 will withhold from the target employee's income for the current pay period. In some embodiments, this information may also be included on the levy notice and thus in the levy information sent to employer 120. In certain embodiments, GUI 600 may enable the user associated with employer 120 to adjust the amount of money in withholding amount 650, e.g., by entering a new amount.

As shown in FIG. 6, GUI 600 may also include a pay selection field 660. GUI 600 may enable the user associated with employer 120 to select the target employers for which employer 120 will satisfy the current amount due on the levy notice. For example, pay selection field 660 associated with John Doe includes a check mark, indicating that employer 120 will satisfy the amount due on the levy notice for John Doe. Pay selection field 660 associated with Jane Doe does not, however, include a check mark, indicating that employer 120 will not satisfy the amount due on the levy notice for Jane Doe. This may be because of a number of factors. For example, Jane Doe may not be employed at employer 120. In this case, not checking pay selection field 660 may also comprise an indication that Jane Doe is not employed at employer 120 (i.e., it may comprise the employment status information discussed above). Or Jane Doe may be in negotiations with levier 110, and employer 120 may not be required to satisfy the payments associated with Jane Doe at this time. In other embodiments, GUI 600 may also include a separate employed selection field (not shown) that may enable the user to make similar indications to affirmatively indicate whether one or more target employees are employed.

After the user is satisfied with the selections in GUI 600, the user may select "Submit" icon 670. Selecting "Submit" icon 670 may cause the device associated with employer 120 to process the selections made by the user and send payment information corresponding to the selections to levy processing system 130. In certain embodiments, this information may also comprise the employment status information and/or the service status information discussed above. That is, when the user sends the payment information, it may also include identifications of which target employees are employed by employer 120 (as indicated by the user via GUI 600). Sending back the payment information may also constitute proof of service of the levy notices to employer 120.

Figure 7:
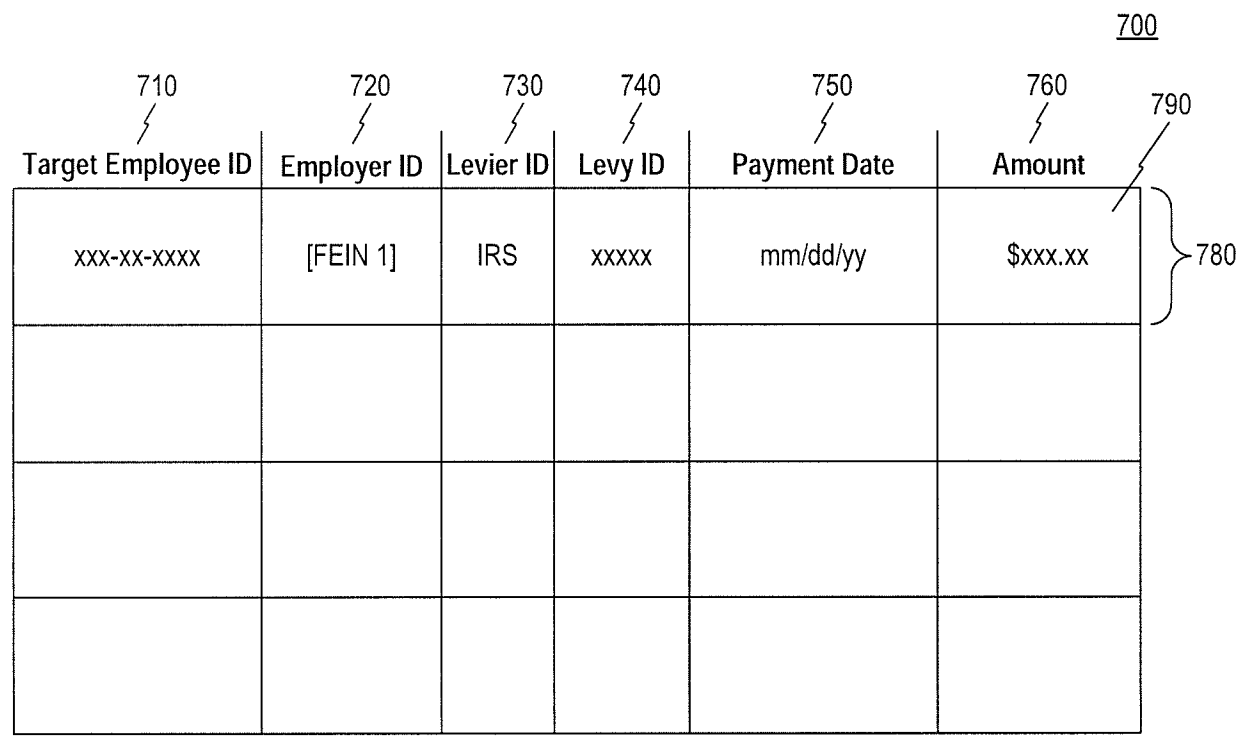

FIG. 7 illustrates an exemplary data structure 700 that includes levy payment information that may be received at levy processing system 130. Data structure 700 may include a plurality of cells 790 arranged in rows 780. Each row may include the levy payment information for a particular target employee. For example, the levy payment information may be arranged in columns and may include a target employee identifier 710, an employer identifier 720, a levier identifier 730, a levy identifier 740, a payment date 750, and a levy amount 770. Of course, other information may also be included, such as levy balance, employment status, contact information for the target employee and/or employer, etc.

In certain embodiments, the levy payment information may be in formats other than that shown in FIG. 7. For example, the levy payment information may be in the form of one or more formats used for electronic transactions with an automated clearing house (ACH), such as a cash concentration or disbursement (CCD), CCD plus addenda (CCD+), or corporate trade exchange (CTX) format. The CCD+ format is a combination of the CCD format and an addenda. And addenda record enables the exchange of electronic payments as well as payment-related information through financial institutions over an ACH network. The CCD+ format is limited to a single addenda record and thus is used for one payment and disbursement per transaction. The CTX format, however, can include up to 9,999 addenda records and thus allows one electronic payment to cover multiple obligations.

In certain embodiments, levy processing system 130 may also receive levy payment information from employer profile module 134, which, as discussed above, may be used to store profile information for employer 120. For example, employer profile module 134 may enable levy processing system 130 to store historical information related to past levy payments made by employer 120 for particular target employees. In certain embodiments, employer profile module 134 may generate payment information based on the historical information. For example, if target employee X is subject to a levy that requires long-term, consistent garnishment of target employee X's income (e.g., in the amount of $Y for Z months), then employer profile module 134 may create a profile for target employee X that automatically generates levy payment information for employee X in the amount of $Y. This amount may be auto-populated for Z months and/or until the levy balance reaches zero or some other predetermined threshold. This automatically generated levy payment information may be added to the other levy payment information received from employer 120 and stored in a data structure such as data structure 700, for example, or in any other format.

Figure 8:
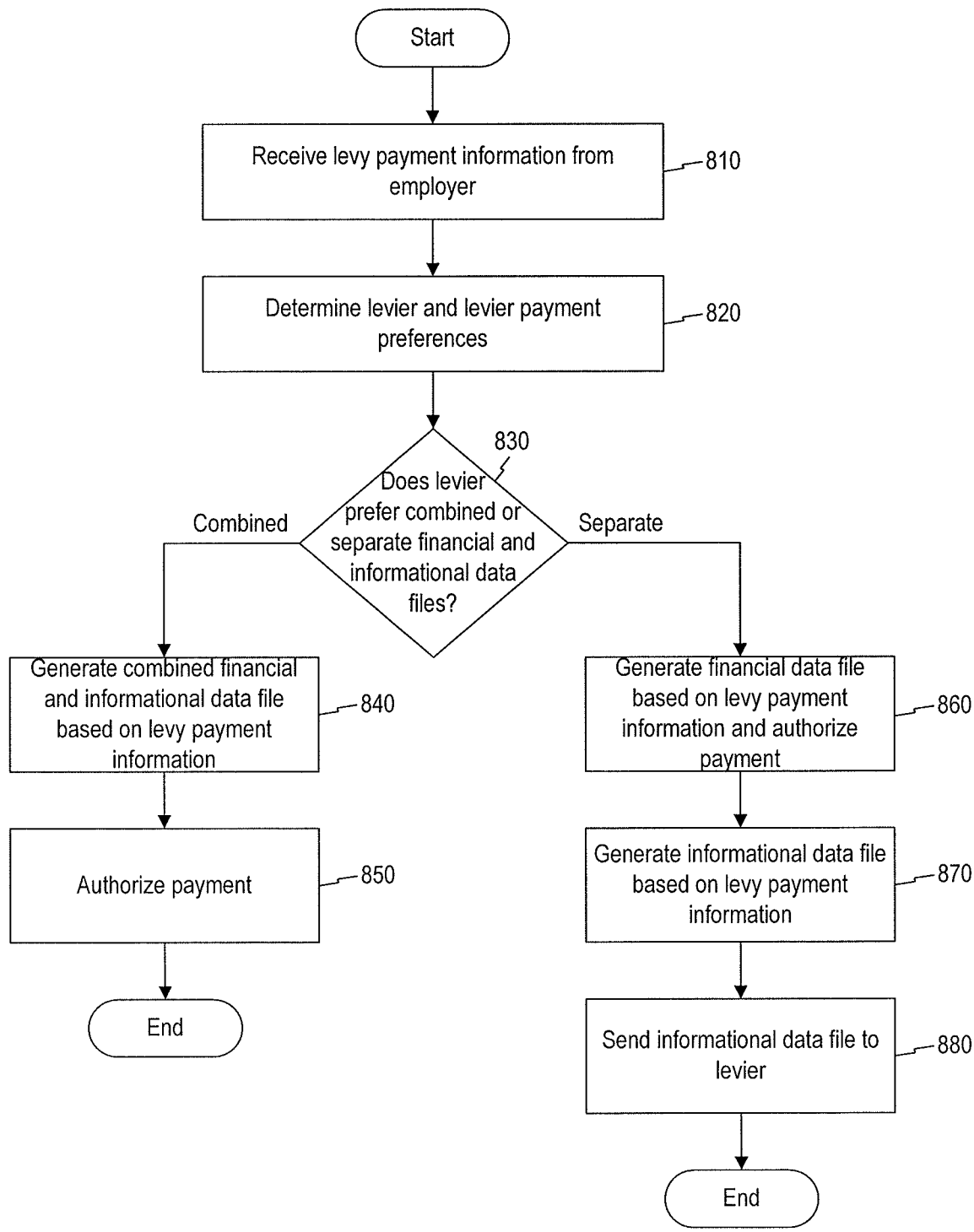
FIG. 8 is a flowchart of another exemplary method for processing levies that may be performed by the levy processing system of FIG. 1A.

FIG. 8 is a flowchart of another exemplary method for processing levies that may be performed by levy processing system 130. The process shown in FIG. 8 may be performed as a part of the process of FIG. 2, e.g., at steps 260 and 270. For example, levy processing system 130 may receive levy payment information from employer 120, similar to step 260 discussed above (step 810). As discussed, the levy payment information may be in the format of data structure 700 of FIG. 7 and/or may be in another format such as CCD, CCD+, CTX, etc.

Levy processing system 130 may also determine which levier 110 corresponds to the levy payment information and may determine levier payment preferences (step 820). Levier payment preferences may be stored in memory 137 and/or storage 138 and may indicate the format in which levier 110 prefers to receive payments. For example, levier 110 may prefer to receive payments as a combined financial and data file that includes both the financial data related to the transaction as well as informational data identifying which levies are being satisfied by the payment. Exemplary combined data formats may include CCD+ and/or CTX formats, as discussed above, although any other format that combines both financial data and informational data related to the transaction may be used. On the other hand, levier 110 may prefer to receive the payment separately from the informational data related to the transaction. For example, levier 110 may prefer to receive payments in the CCD format, or any other format that does not include the informational data (e.g., CTX format without any addenda), and to receive the informational data identifying the levies that are being satisfied by the payment via a separate data file.

If levy processing system 130 determines that levier 110 prefers a combined financial and informational data file (step 830, combined), then levy processing system 130 may generate a combined financial and informational data file (e.g., CCD+, CTX, etc.) that includes some or all of the levy payment information received from employer 120. Levy processing system 130 may then authorize payment of the amount (step 850). This may include sending all or part of the combined financial and informational data file to levier 110. This may also include sending instructions to the bank of levy processing system 130 (e.g., bank 125) to issue (through an ACH, not shown in FIG. 1) an ACH debit for levy processing system's 130 bank and an ACH credit for levier's 110 bank (e.g., bank 115) for the sum of the payment amounts identified in the levy payment information.

If, on the other hand, levy processing system 130 determines that levier 110 prefers receiving separate financial and informational data files (step 830, separate), then levy processing system 130 may generate a financial data file based on the received levy payment information and authorize the payment (step 860). This may include sending a financial data file (e.g., CCD, CTX without addenda) to levier 110. This may also include sending instructions to the bank of levy processing system 130 (e.g., bank 125) to issue (through an ACH, not shown in FIG. 1) an ACH debit for levy processing system's 130 bank and an ACH credit for levier's 110 bank (e.g., bank 115) for the sum of the payment amounts identified in the levy payment information.

Levy processing system 130 may also generate a separate informational data file using the received levy payment information (step 870). For example, levy processing system 130 may generate a file that includes identifying information for the levies that were satisfied in the payment authorized in step 860. In certain embodiments, levy processing system 130 may use the levy payment information received from employer 120 as the informational data file without any further processing. Levy processing system 130 may then send the informational data file to levier 110 (step 880). This file may be sent via any method, such as FTP, e-mail, fax, etc.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), XML, Java, C++, JavaScript, HTML, HTML/AJAX, Flex, Silverlight, or any other now known or later created programming language. One or more of such software sections or modules can be integrated into a computer system or existing browser software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A method for processing levies by a levy processing system separate from and in communication with a plurality of employers and a plurality of leviers, the method comprising:

providing, at a processor included in the levy processing system, remote access to users associated with the plurality of employers so any one of the users can access levy information and update employment status information and levy payment information of employees in real time through a graphical user interface over a network;

receiving, at the processor included in the levy processing system, employer registration information from a first employer among the plurality of employers over the network through a graphical user interface, the employer registration information including employer demographic information, the employer demographic information including contact information, banking information, and identification information of the employer, and the employer registration information further including employer preference information, the employer preference information including a preferred method of receiving new levies and a preferred frequency of receiving notification of new levies, the preferred method including at least one of fax, file transfer protocol (FTP), or email, and the preferred frequency being real time or any other pre-determined interval;

receiving, at the processor, levy information from at least one of the plurality of leviers, the levy information pertaining to one of a plurality of employees, each employee being associated with a levy notice that is sent to the first employer, the levy information being in a non-standardized format dependent on a corresponding one of the plurality of leviers that issued the related levy notice, each one of the plurality of leviers being a government authority for collecting tax, and each of the one or more of the levy notices including an identification of a target employee who owes tax to the levier, and an amount of the tax that the target employee owes the levier;

converting, by the processor, the non-standardized levy information into a standardized electronic levy format associated with the levy processing system;

storing, by the processor, the converted standardized levy information in a levy database;

automatically generating in real time upon storing the converted standardized levy information, by the processor, a notification to notify the first employer to whom the one or more levy notices are issued, of the converted standardized levy information;

transmitting, by the processor, the notification to the first employer via the network by using the preferred method and the preferred frequency in order for the employer to provide employee status information and levy payment information;

receiving, by the processor and from the employer via the network through the graphical user interface, employment status information indicating whether or not the target employee is employed by the employer, the employment status information being generated by the employer by cross referencing information of the target employee with a database of current employees;

when the target employee is employed by the employer:
generating, by the processor, a graphical user interface to be displayed on a device associated with the employer to enable a user associated with the employer to enter levy payment information of the target employee, the levy payment information indicating the amount of money to be withheld from the target employee's income until a levy balance reaches zero, the levy payment information including an identifier of the target employee and a payment amount corresponding to the amount of the tax that the target employee owes the levier as indicated in at least one of the one or more levy notices;

generating, by the processor, data to authorize a payment to the levier, the payment corresponding to the received levy payment information;

determining, by the processor, levier payment preferences of a first levier among the plurality of leviers for receiving data related to the payment sent to the first levier, the levier payment preferences of the first levier being stored in a memory and indicating whether the levier prefers receiving a combined financial and informational data file or receiving separated financial and informational data files according to the levier payment preferences, wherein financial data relates to levy payment transactions and informational data identifies which levies are being satisfied by the levy payment;

in response to determining that the first levier prefers to receive a combined financial and informational data file, generating, by the processor, the combined financial and informational data file including the levy payment information, sending the combined financial and informational data file by the processor to the first levier, and authorizing payment of the levy payment amount; and in response to determining that the first levier prefers to receive a separate financial data file and a separate informational data file, generating, by the processor, the separate financial data file, authorizing, by the processor, payment of the levy payment amount generating, by the processor, the separate informational data file, and sending the informational data file by the processor to the first levier separately from the financial file; and when the target employee is not employed by the employer:

receiving, by the processor and from the employer, a notification that a target employee associated with a levy notice is not employed by the employer; and responsive to receiving the notification, updating, by the processor of the levy processing system, a no-longer-employed data structure in the levy database by adding an entry for the target employee, the no-longer-employed data structure including identifiers of a plurality of target employees that are not employed by the employer, a name of the employer, and a date of attempted service and a last date of employment of each one of the plurality of target employees, and sending a notification, at predetermined intervals by the processor to the first levier which issued a levy notice associated with the target employee, the notification including the no-longer-employed data structure to identify that the target employee is not employed by the employer.

2. The method of claim 1, wherein the generating, by the processor, a graphical user interface to be displayed on a device associated with the employer to enable a user associated with the employer to enter levy payment information of the target employee includes:

generating the graphical user interface to enable the user associated with the employer to select, from among a plurality of levy notices, levy notices that the employer will satisfy, wherein the levy payment information is determined based on the selected levy notices that the employer will satisfy.

3. The method of claim 1, wherein the levy payment information further comprises a levy identifier and a levier identifier.

4. The method of claim 1, further comprising:

uploading the converted levy information to an FTP site accessible by the employer;

receiving a notification that the employer has retrieved the converted levy information from the FTP site; and responsive to receiving the notification that the employer has retrieved the converted levy information, generating a confirmation of service message; and sending the confirmation of service message to the levier.

5. The method of claim 1, further comprising:

sending the converted levy information to the employer via one or more e-mail messages;

receiving a notification that the employer has read the one or more e-mail messages; and responsive to receiving the notification that the employer received the one or more e-mail messages, generating a confirmation of service message; and sending the confirmation of service message to the levier.

6. A system for processing levies, the system being separate from and in communication with a plurality of employers and a plurality of leviers, the system comprising:

one or more memories storing instructions and a no-longer-employed data structure that includes identifiers of a plurality of target employees that are not employed by the employer, a name of the employer, and a date of attempted service and a last date of employment of each one of the plurality of target employees; and one or more processors coupled to the one or more memories and configured to execute the instructions stored in the one or more memories to:

provide remote access to users associated with the plurality of employers so any one of the users can access levy information and update employment status information and levy payment information of employees in real time through a graphical user interface over a network;

receive employer registration information from a first employer among the plurality of employers over the network through a graphical user interface, the employer registration information including employer demographic information, the employer demographic information including contact information, banking information, and identification information of the employer, and the employer registration information further including employer preference information, the employer preference information including a preferred method of receiving new levies and a preferred frequency of receiving notification of new levies, the preferred method including at least one of fax, file transfer protocol (FTP), or email, and the preferred frequency being real time or any other pre-determined interval;

receive levy information from at least one of the plurality of leviers, the levy information pertaining to one of a plurality of employees, each employee being associated with a levy notice that is sent to the first employer, the levy information being in a non-standardized format dependent on a corresponding one of the plurality of leviers that issued the related levy notice, each one of the the plurality of leviers being a government authority for collecting tax, and each of the one or more of the levy notices including an identification of a target employee who owes tax to the levier, and an amount of the tax that the target employee owes the levier;

convert the non-standardized levy information into a standardized electronic levy format associated with the system;

store the converted standardized levy information in a levy database;

automatically generate in real time, upon storing the converted standardized levy information, a notification to notify the first employer to whom the one or more levy notices are issued, of the converted standardized levy information;

transmit the notification to the first employer via the network by using the preferred method and the preferred frequency in order for the employer to provide employee status information and levy payment information;

receive from the employer via the network through the graphical user interface, employment status information indicating whether or not the target employee is employed by the employer, the employment status information being generated by the employer by cross referencing information of the target employee with a database of current employees;

when the target employee is employed by the employer:
generate a graphical user interface to be displayed on a device associated with the employer to enable a user associated with the employer to enter levy payment information of the target employee, the levy payment information indicating the amount of money to be withheld from the target employee's income until a levy balance reaches zero, the levy payment information including an identifier of the target employee and a payment amount corresponding to the amount of the tax that the target employee owes the levier as indicated in at least one of the one or more levy notices;
generate data to authorize a payment to the levier, the payment corresponding to the received levy payment information;
determine levier payment preferences of a first levier among the plurality of leviers for receiving data related to the payment sent to the first levier, the levier payment preferences of the first levier being stored in a memory and indicating whether the levier prefers receiving a combined financial and informational data file or receiving separated financial and informational data files according to the levier payment preferences, wherein financial data relates to levy payment transactions and informational data identifies which levies are being satisfied by the levy payment;
in response to determining that the first levier prefers to receive a combined financial and informational data file, generate the combined financial and informational data file including the levy payment information, send the combined financial and informational data file to the first levier, and authorize payment of the levy payment amount; and
in response to determining that the first levier prefers to receive a separate financial data file and a separate informational data file, generate the separate financial data file, authorize payment of the levy payment amount, generate the separate informational data file, and send the informational data file to the first levier separately from the financial file; and when the target employee is not employed by the employer:
receive, from the employer, a notification that a target employee associated with a levy notice is not employed by the employer; and
responsive to receiving the notification, update a no-longer-employed data structure in the levy database by adding an entry for the target employee, the no-longer-employed data structure including identifiers of a plurality of target employees that are not employed by the employer, a name of the employer, and a date of attempted service and a last date of employment of each one of the plurality of target employees, and send a notification, at predetermined intervals to the first levier which issued a levy notice associated with the target employee, the notification including the no-longer-employed data structure to identify that the target employee is not employed by the employer.

7. The system of claim 6, the one or more processors being further configured to:
generate the graphical user interface to enable the user associated with the employer to select, from among a plurality of levy notices, levy notices that the employer will satisfy, wherein the levy payment information is determined based on the selected levy notices that the employer will satisfy.

8. The system of claim 6, wherein the levy payment information further comprises a levy identifier and a levier identifier.

9. The system of claim 6, the one or more processors being further configured to:
generate a command to upload the converted levy information to an FTP site accessible by the employer;
receive a notification that the employer has retrieved the converted levy information from the FTP site; and
generate a confirmation of service message responsive to receiving the notification that the employer has retrieved the converted levy information; and
send the confirmation of service message to the levier.

10. The system of claim 6, the one or more processors being further configured to:
send the converted levy information to the employer via one or more e-mail messages;
receive a notification that the employer has read the one or more e-mail messages; and
generate a confirmation of service message responsive to receiving the notification that the employer received the one or more e-mail messages; and
send the confirmation of service message to the levier.

11. A nontransitory computer-readable medium storing instructions that, when executed, enable one or more processors at a levy processing system separate from and in communication with a plurality of employers and a plurality of leviers to:
provide remote access to users associated with the plurality of employers so any one of the users can access levy information and update employment status information and levy payment information of employees in real time through a graphical user interface over a network;
receive employer registration information from a first employer among the plurality of employers over the network through a graphical user interface, the employer registration information including employer demographic information, the employer demographic information including contact information, banking information, and identification information of the employer, and the employer registration information further including employer preference information, the employer preference information including a preferred method of receiving new levies and a preferred frequency of receiving notification of new levies, the preferred method including at least one of fax, file transfer protocol (FTP), or email, and the preferred frequency being real time or any other pre-determined interval;
receive levy information from at least one of the plurality of leviers, the levy information pertaining to one of a plurality of employees, each employee being associated with a levy notice that is sent to the first employer, the levy information being in a non-standardized format dependent on a corresponding one of the plurality of leviers that issued the related levy notice, each one of the the plurality of leviers being a government authority for collecting tax, and each of the one or more of the levy notices including an identification of a target employee who owes tax to the levier, and an amount of the tax that the target employee owes the levier;

convert the non-standardized levy information into a standardized electronic levy format associated with the system;

store the converted standardized levy information in a levy database;

automatically generate in real time, upon storing the converted standardized levy information, a notification to notify the first employer to whom the one or more levy notices are issued, of the converted standardized levy information;

transmit the notification to the first employer via the network by using the preferred method and the preferred frequency in order for the employer to provide employee status information and levy payment information;

receive from the employer via the network through the graphical user interface, employment status information indicating whether or not the target employee is employed by the employer, the employment status information being generated by the employer by cross referencing information of the target employee with a database of current employees;

when the target employee is employed by the employer:
  generate a graphical user interface to be displayed on a device associated with the employer to enable a user associated with the employer to enter levy payment information of the target employee, the levy payment information indicating the amount of money to be withheld from the target employee's income until a levy balance reaches zero, the levy payment information including an identifier of the target employee and a payment amount corresponding to the amount of the tax that the target employee owes the levier as indicated in at least one of the one or more levy notices;
  generate data to authorize a payment to the levier, the payment corresponding to the received levy payment information;
  determine levier payment preferences of a first levier among the plurality of leviers for receiving data related to the payment sent to the first levier, the levier payment preferences of the first levier being stored in a memory and indicating whether the levier prefers receiving a combined financial and informational data file or receiving separated financial and informational data files according to the levier payment preferences, wherein financial data relates to levy payment transactions and informational data identifies which levies are being satisfied by the levy payment;
  in response to determining that the first levier prefers to receive a combined financial and informational data file, generate the combined financial and informational data file including the levy payment information, send the combined financial and informational data file to the first levier, and authorize payment of the levy payment amount; and
  in response to determining that the first levier prefers to receive a separate financial data file and a separate informational data file, generate the separate financial data file, authorize payment of the levy payment amount, generate the separate informational data file, and send the informational data file to the first levier separately from the financial file; and when the target employee is not employed by the employer:
  receive, from the employer, a notification that a target employee associated with a levy notice is not employed by the employer; and
  responsive to receiving the notification, update a no-longer-employed data structure in the levy database by adding an entry for the target employee, the no-longer-employed data structure including identifiers of a plurality of target employees that are not employed by the employer, a name of the employer, and a date of attempted service and a last date of employment of each one of the plurality of target employees, and send a notification, at predetermined intervals to the first levier which issued a levy notice associated with the target employee, the notification including the no-longer-employed data structure to identify that the target employee is not employed by the employer.

* * * * *

UNITED STATES PATENT AND TRADEMARK OFFICE
CERTIFICATE OF CORRECTION

PATENT NO. : 10,672,083 B2
APPLICATION NO. : 13/494329
DATED : June 2, 2020
INVENTOR(S) : John David Polk Page 1 of 1

It is certified that error appears in the above-identified patent and that said Letters Patent is hereby corrected as shown below:

In the Claims

Claim 6, Column 16, Line 47, "each one of the the plurality" should read -- each one of the plurality --.

Claim 11, Column 19, Lines 3-4, "each one of the the plurality" should read -- each one of the plurality --.

Signed and Sealed this
Eighteenth Day of August, 2020

Andrei Iancu
*Director of the United States Patent and Trademark Office*